US010256760B2

(12) United States Patent
Fukumaru et al.

(10) Patent No.: US 10,256,760 B2
(45) Date of Patent: Apr. 9, 2019

(54) POWER CONVERSION APPARATUS, CONTROL APPARATUS, AND CONTROL METHOD USING A CORRECTION VECTOR

(71) Applicant: Kabushiki Kaisha Yaskawa Denki, Kitakyushu-shi (JP)

(72) Inventors: Shingo Fukumaru, Kitakyushu (JP); Shinya Morimoto, Kitakyushu (JP); Hideaki Iura, Kitakyushu (JP); Hirofumi Kinomura, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/252,369

(22) Filed: Aug. 31, 2016

(65) Prior Publication Data
US 2017/0063253 A1    Mar. 2, 2017

(30) Foreign Application Priority Data
Sep. 1, 2015    (JP) ................. 2015-172343

(51) Int. Cl.
*H02M 7/5395*    (2006.01)
*H02P 21/13*    (2006.01)
(Continued)

(52) U.S. Cl.
CPC .......... *H02P 21/13* (2013.01); *H02M 7/5395* (2013.01); *H02P 21/50* (2016.02); *H02P 27/08* (2013.01);
(Continued)

(58) Field of Classification Search
CPC . H02M 2001/0009; H02M 2001/0025; H02M 7/5387; H02M 7/53871;
(Continued)

(56) References Cited

U.S. PATENT DOCUMENTS 5,955,862 A * 9/1999 Nguyen Phuoc ........................... H02M 7/53875
318/801
6,201,720 B1 * 3/2001 Tracy ................ H02M 7/53875
363/131
(Continued)

FOREIGN PATENT DOCUMENTS

CN    103580587 A    2/2014
JP    3-230767    10/1991
(Continued)

OTHER PUBLICATIONS

Office Action dated Dec. 5, 2017, in Japanese Patent Application No. 2015-172343 (with English-language translation).
(Continued)

*Primary Examiner* — Timothy J Dole
*Assistant Examiner* — David A. Singh
(74) *Attorney, Agent, or Firm* — Oblon, McClelland, Maier & Neustadt, L.L.P.

(57) ABSTRACT

A power conversion apparatus includes: a power converter that includes a plurality of switching elements; and a controller that controls the plurality of switching elements. The controller includes: a command generator that generates a voltage command vector; a synthesizer that synthesizes a correction vector with the voltage command vector to generate a synthetic vector; an adjuster that adjusts an output time of a plurality of voltage vectors from the power converter, the output time being corresponding to the synthetic vector; and a correction vector generator that generates the correction vector on the basis of an adjustment result of the adjuster.

22 Claims, 9 Drawing Sheets

(51) Int. Cl.
  *H02P 27/08* (2006.01)
  *H02P 21/00* (2016.01)
  *H02M 1/00* (2006.01)
  *H02M 7/5387* (2007.01)

(52) U.S. Cl.
  CPC ............... *H02M 2001/0009* (2013.01); *H02M 2001/0025* (2013.01); *H02M 2007/53876* (2013.01)

(58) Field of Classification Search
  CPC ............... H02M 7/539; H02M 7/5395; H02M 2007/53876; H02P 21/13
  See application file for complete search history.

(56) References Cited

U.S. PATENT DOCUMENTS

| | | | | |
|---|---|---|---|---|
| 2004/0169488 A1* | 9/2004 | Maeda | ............... | H02M 7/53873 318/801 |
| 2010/0213769 A1* | 8/2010 | Sakakibara | ........... | H02M 5/297 307/82 |
| 2013/0058144 A1* | 3/2013 | Hiramatsu | ............... | H02M 1/12 363/131 |
| 2014/0035491 A1* | 2/2014 | Mukai | .................... | H02P 21/05 318/400.02 |
| 2015/0130432 A1* | 5/2015 | Yamazaki | ............. | H02M 5/297 323/272 |
| 2015/0263661 A1* | 9/2015 | Mo | ....................... | H02P 27/047 318/807 |
| 2016/0020708 A1* | 1/2016 | Nakagawa | ........ | H02M 7/53875 363/131 |
| 2018/0091079 A1* | 3/2018 | Kashima | ................. | H02P 21/22 |

FOREIGN PATENT DOCUMENTS

| | | |
|---|---|---|
| JP | 2003-189670 A | 7/2003 |
| JP | 2012-235582 | 11/2012 |
| JP | 2014-33566 | 2/2014 |
| JP | 2014-197978 | 10/2014 |
| JP | 2015-42010 | 3/2015 |

OTHER PUBLICATIONS

Chinese Office Action dated Jul. 3, 2018, in Patent Application No. 201610788527.4 (with English translation), citing document AO therein, 13 pages.

* cited by examiner

| PHASE $\theta v$ | REGION | FUNDAMENTAL VOLTAGE VECTOR FOR REGION |
|---|---|---|
| $0 \leq \theta v < 60$ | 1 | $V_1, V_3$ |
| $60 \leq \theta v \leq 120$ | 2 | $V_2, V_3$ |
| $120 < \theta v \leq 180$ | 3 | $V_2, V_6$ |
| $180 < \theta v < 240$ | 4 | $V_4, V_6$ |
| $240 \leq \theta v \leq 300$ | 5 | $V_4, V_5$ |
| $300 < \theta v < 360$ | 6 | $V_5, V_1$ |

FIG. 5

| VOLTAGE PHASE | REGION | VOLTAGE VECTOR PATTERN |
|---|---|---|
| $0 \leq \theta v < 60$ | 1 | $V_0 \to V_1 \to V_3 \to V_3 \to V_1 \to V_0$ |
| $60 \leq \theta v \leq 120$ | 2 | $V_0 \to V_2 \to V_3 \to V_3 \to V_2 \to V_0$ |
| $120 < \theta v \leq 180$ | 3 | $V_0 \to V_2 \to V_6 \to V_6 \to V_2 \to V_0$ |
| $180 < \theta v < 240$ | 4 | $V_0 \to V_4 \to V_6 \to V_6 \to V_4 \to V_0$ |
| $240 \leq \theta v \leq 300$ | 5 | $V_0 \to V_4 \to V_5 \to V_5 \to V_4 \to V_0$ |
| $300 < \theta v < 360$ | 6 | $V_0 \to V_1 \to V_5 \to V_5 \to V_1 \to V_0$ |

FIG. 6

| FUNDAMENTAL VOLTAGE VECTOR | Sup | Svp | Swp | BUS BAR CURRENT $i_{dc}$ |
|---|---|---|---|---|
| $V_1$ | 1 | 0 | 0 | $i_u$ |
| $V_2$ | 0 | 1 | 0 | $i_v$ |
| $V_4$ | 0 | 0 | 1 | $i_w$ |
| $V_6$ | 0 | 1 | 1 | $-i_u$ |
| $V_5$ | 1 | 0 | 1 | $-i_v$ |
| $V_3$ | 1 | 1 | 0 | $-i_w$ |
| $V_0$ | 0 | 0 | 0 | – |
| $V_7$ | 1 | 1 | 1 | – |

FIG. 7

| REGION | SETTING OF MODULATION RATIO |
|---|---|
| 1 | U PHASE: $\zeta_u = \zeta_{1\_lim} + \zeta_{3\_lim}$<br>V PHASE: $\zeta_v = \zeta_{3\_lim}$<br>W PHASE: $\zeta_w = 0$ |
| 2 | U PHASE: $\zeta_u = \zeta_{3\_lim}$<br>V PHASE: $\zeta_v = \zeta_{2\_lim} + \zeta_{3\_lim}$<br>W PHASE: $\zeta_w = 0$ |
| 3 | U PHASE: $\zeta_u = 0$<br>V PHASE: $\zeta_v = \zeta_{2\_lim} + \zeta_{6\_lim}$<br>W PHASE: $\zeta_w = \zeta_{6\_lim}$ |
| 4 | U PHASE: $\zeta_u = 0$<br>V PHASE: $\zeta_v = \zeta_{6\_lim}$<br>W PHASE: $\zeta_w = \zeta_{4\_lim} + \zeta_{6\_lim}$ |
| 5 | U PHASE: $\zeta_u = \zeta_{5\_lim}$<br>V PHASE: $\zeta_v = 0$<br>W PHASE: $\zeta_w = \zeta_{4\_lim} + \zeta_{5\_lim}$ |
| 6 | U PHASE: $\zeta_u = \zeta_{1\_lim} + \zeta_{5\_lim}$<br>V PHASE: $\zeta_v = 0$<br>W PHASE: $\zeta_w = \zeta_{5\_lim}$ |

FIG. 8

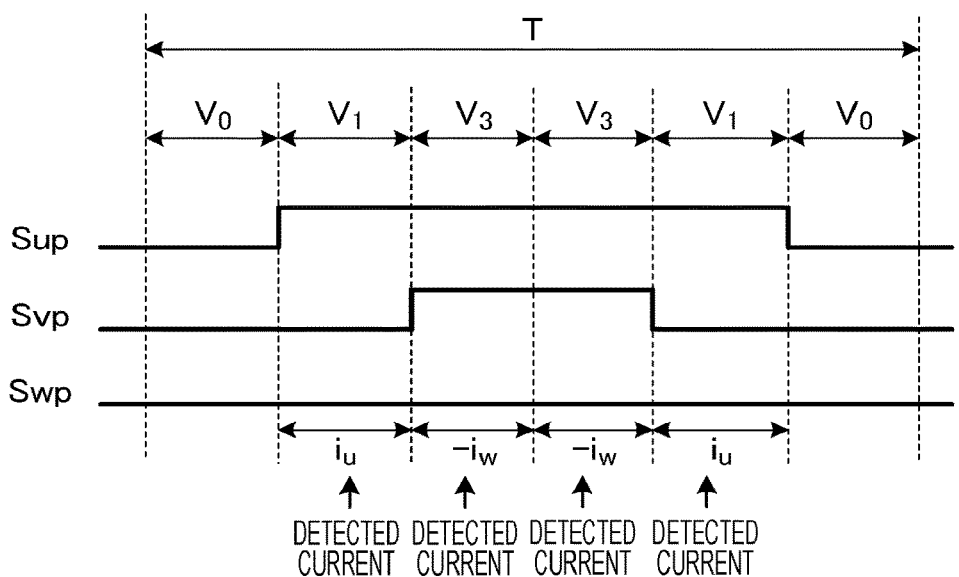

FIG. 12

| REGION | CURRENT POLARITY |
|---|---|
| 1 | $I_{sig\_p}=Sign(i_u)$ |
| 1 | $I_{sig\_n}=Sign(i_v)$ |
| 2 | $I_{sig\_p}=Sign(i_v)$ |
| 2 | $I_{sig\_n}=Sign(i_u)$ |
| 3 | $I_{sig\_p}=Sign(i_v)$ |
| 3 | $I_{sig\_n}=Sign(i_w)$ |
| 4 | $I_{sig\_p}=Sign(i_w)$ |
| 4 | $I_{sig\_n}=Sign(i_v)$ |
| 5 | $I_{sig\_p}=Sign(i_w)$ |
| 5 | $I_{sig\_n}=Sign(i_u)$ |
| 6 | $I_{sig\_p}=Sign(i_u)$ |
| 6 | $I_{sig\_n}=Sign(i_w)$ |

FIG. 13

| POLARITY | COMPENSATION COEFFICIENT |
|---|---|
| $I_{sig\_p} \times I_{sig\_n} \geq 0$ | $V_{p\_compk}=0$ |
| $I_{sig\_p} \times I_{sig\_n} \geq 0$ | $V_{n\_compk}=1$ |
| $I_{sig\_p} \times I_{sig\_n} < 0$ | $V_{p\_compk}=2$ |
| $I_{sig\_p} \times I_{sig\_n} < 0$ | $V_{n\_compk}=1$ |

# POWER CONVERSION APPARATUS, CONTROL APPARATUS, AND CONTROL METHOD USING A CORRECTION VECTOR

CROSS-REFERENCE TO RELATED APPLICATION

This application claims priority from Japanese Patent Application No. 2015-172343 filed with the Japan Patent Office on Sep. 1, 2015, the entire content of which is hereby incorporated by reference.

BACKGROUND

1. Technical Field

Embodiments to be disclosed herein relate to a power conversion apparatus, a control apparatus, and a control method.

2. Description of the Related Art

One of the known power conversion apparatuses includes a power converter including a plurality of switching elements. In the power conversion, the plurality of switching elements is controlled so that this power converter outputs a plurality of different voltage vectors.

In this power conversion apparatus, the current of the power converter is detected while the power converter outputs the voltage vector. Therefore, when the voltage vector is output for a very short time, the stable detection of the current may be difficult.

In view of this, the technique as below has been suggested (for example, see JP-A-2003-189670). In this technique, the duty ratio of the PWM signal is corrected to the duty value at which the current detection is possible in one carrier period or a half carrier period of the PWM signal. In the next carrier period, the increase or decrease of the duty ratio is corrected.

SUMMARY

A power conversion apparatus includes: a power converter that includes a plurality of switching elements; and a controller that controls the plurality of switching elements. The controller includes: a command generator that generates a voltage command vector; a synthesizer that synthesizes a correction vector with the voltage command vector to generate a synthetic vector; an adjuster that adjusts an output time of a plurality of voltage vectors from the power converter, the output time being corresponding to the synthetic vector; and a correction vector generator that generates the correction vector on the basis of an adjustment result of the adjuster.

BRIEF DESCRIPTION OF THE DRAWINGS

FIG. 5 illustrates the relation between the regions and the voltage vector patterns;

FIG. 6 illustrates the relation among the fundamental voltage vectors, the PWM signals, and the bus bar currents;

FIG. 7 illustrates the relation between the regions and the modulation ratio of the three phase voltages;

FIG. 8 illustrates an example of the relation among the detected current, the PWM signal, and the fundamental voltage vector output from the power converter when the synthetic vector is included in the region 1;

FIG. 12 illustrates the relation between the regions and the current polarity;

FIG. 13 illustrates an example of the compensation coefficient table; and

DESCRIPTION OF THE EMBODIMENTS

Figure 1:
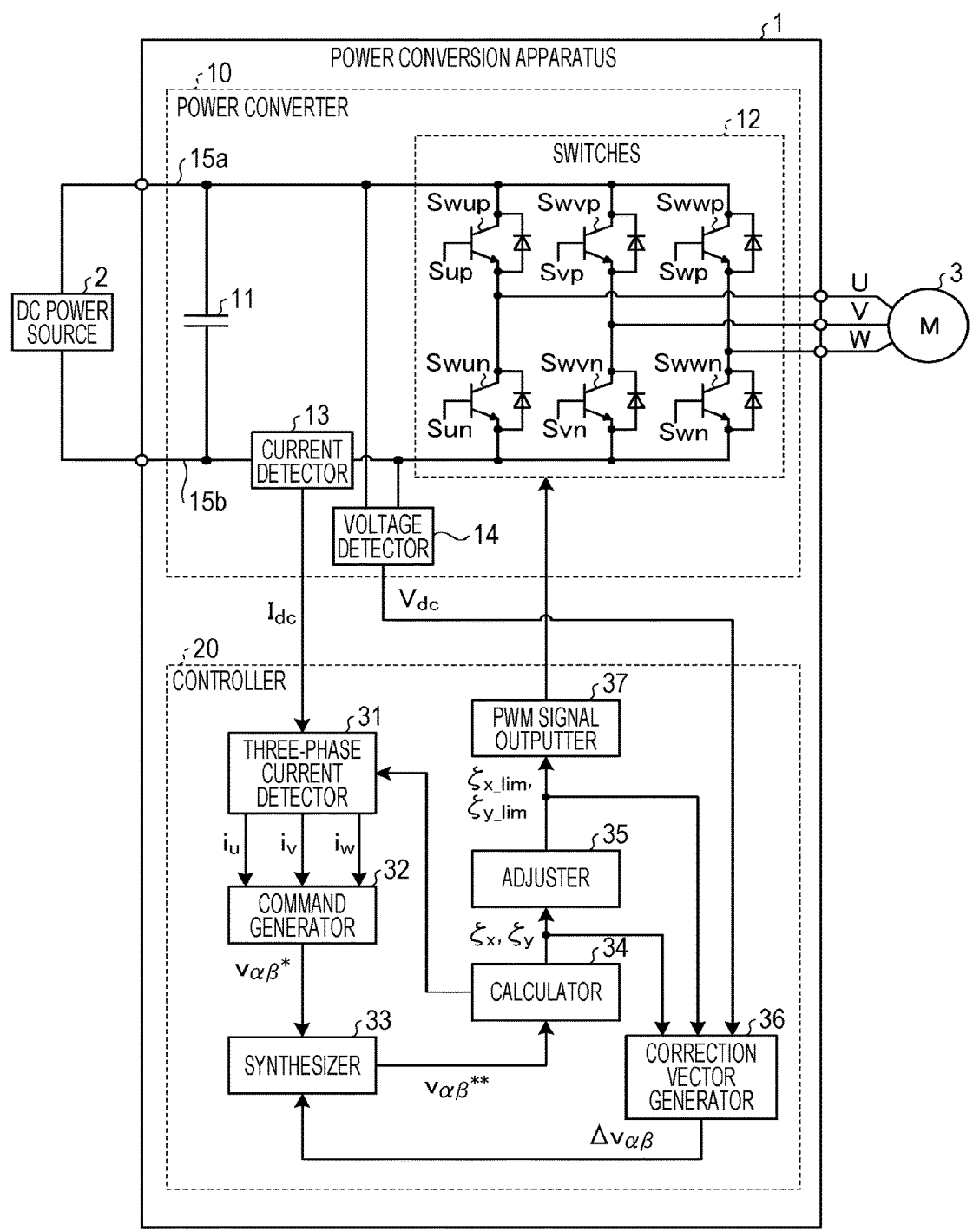
FIG. 1 illustrates a structure example of a power conversion apparatus according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A power conversion apparatus according to one aspect of the embodiment includes a power converter that includes a plurality of switching elements, and a controller that controls the plurality of switching elements. The controller includes a command generator, a synthesizer, an adjuster, and a correction vector generator. The command generator generates a voltage command vector. The synthesizer synthesizes a correction vector with the voltage command vector to generate a synthetic vector. The adjuster adjusts the output time of the plurality of voltage vectors from the power converter, the output time being corresponding to the synthetic vector. The correction vector generator generates the correction vector on the basis of the adjustment result of the adjuster.

According to the aspect of the embodiment, a power conversion apparatus, a control apparatus, and a control method, which can control the voltage vector as appropriate to enable the stable detection of the current can be provided.

Embodiments of a power conversion apparatus, a control apparatus, and a control method to be disclosed in the present application will be described below in detail with reference to the attached drawings. The embodiments to be described below will not limit the technical range of the present disclosure.

1. Power Conversion Apparatus

FIG. 1 illustrates a structure example of a power conversion apparatus 1 according to an embodiment. The power conversion apparatus 1 illustrated in FIG. 1 is disposed between a DC power source 2 and an electric motor 3. The power conversion apparatus 1 includes a power converter 10 and a controller 20.

The power converter 10 includes a capacitor 11, switches 12, a current detector 13, and a voltage detector 14. The power converter 10 converts the DC power, which is supplied from the DC power source 2, into three-phase AC power, and outputs the three-phase AC power to the electric motor 3. The capacitor 11 is connected in parallel to the DC power source 2. This capacitor 11 is a capacitor connected between DC bus bars 15a and 15b (hereinafter also referred to as DC bus bars 15), and is also referred to as a main circuit capacitor.

The switches 12 constitute, for example, a three-phase bridge circuit. As illustrated in FIG. 1, the switches 12 include a plurality of switching elements Swup, Swun, Swvp, Swvn, Swwp, and Swwn (hereinafter may be referred to as switching elements Sw). The ON/OFF of the plurality of switching elements Sw is controlled with the controller 20. Accordingly, the DC power supplied from the DC power source 2 is converted into the three-phase AC power and the three-phase AC power is output to the electric motor 3. The power conversion apparatus 1 may output the three-phase AC power to the power system instead of to the electric motor 3.

The switching element Sw may be, for example, a semiconductor switching element such as a Metal-Oxide-Semiconductor Field-Effect Transistor (MOSFET) or Insulated Gate Bipolar Transistor (IGBT). The switching element Sw may alternatively be the next-generation semiconductor switching element such as SiC or GaN. In the description below, the switching elements Swup, Swvp, and Swwp may be referred to as the upper arms and the switching elements Swun, Swvn, and Swwn may be referred to as the lower arms.

The current detector 13 detects the current flowing in the DC bus bar 15. The current detector 13 includes, for example, a Hall element as a magnetoelectric converter, a shunt resistor, or a current transformer. The current detector 13 detects the instantaneous value $I_{dc}$ of the current flowing in the DC bus bar 15 (hereinafter referred to as bus bar current $I_{dc}$). The voltage detector 14 detects the instantaneous value $V_{dc}$ of the voltage between the DC bus bars 15a and 15b (hereinafter referred to as the bus bar voltage $V_{dc}$).

The controller 20 includes a three-phase current detector 31, a command generator 32, a synthesizer 33, a calculator 34, an adjuster 35, a correction vector generator 36, and a PWM signal outputter 37.

The controller 20 includes, for example, a microcomputer including a Central Processing Unit (CPU), a Read Only Memory (ROM), a Random Access Memory (RAM), an input/output port, and the like, and/or other various circuits. Causing the CPU of the microcomputer to read out programs stored in the ROM and execute the programs can achieve the functions of the three-phase current detector 31, the command generator 32, the synthesizer 33, the calculator 34, the adjuster 35, the correction vector generator 36, and the PWM signal outputter 37.

The three-phase current detector 31, the command generator 32, the synthesizer 33, the calculator 34, the adjuster 35, the correction vector generator 36, and the PWM signal outputter 37 may be partly or entirely configured by hardware such as Application Specific Integrated Circuit (ASIC) or Field Programmable Gate Array (FPGA).

The three-phase current detector 31 detects the instantaneous values $i_u$, $i_v$, and $i_w$ of the currents flowing between the power converter 10, and the U phase, V phase, and W phase of the electric motor 3 (the currents are hereinafter referred to as the phase currents $i_u$, $i_v$, and $i_w$) on the basis of the bus bar current $I_{dc}$ detected by the current detector 13. The phase current $i_u$ is the U-phase current. The phase current $i_v$ is the V-phase current. The phase current $i_w$ is the W-phase current.

The command generator 32 generates a voltage command vector $v_{\alpha\beta}*$ so that the phase currents $i_u$, $i_v$, and $i_w$ become the target current on the basis of the phase currents $i_u$, $i_v$, and $i_w$. The voltage command vector $v_{\alpha\beta}*$ includes, for example, the α-axis voltage command $v_\alpha*$ and the β-axis voltage command $v_\beta*$, which are the αβ-axis components of the two orthogonal axes on the fixed coordinate.

The synthesizer 33 synthesizes the correction vector $\Delta v_{\alpha\beta}$ with the voltage command vector $v_{\alpha\beta}*$ to generate the synthetic vector $v_{\alpha\beta}$. The synthetic vector $v_{\alpha\beta}$ includes the α-axis voltage command $v_\alpha$ and the β-axis voltage command $v_\beta$.

Figures 2, 3:
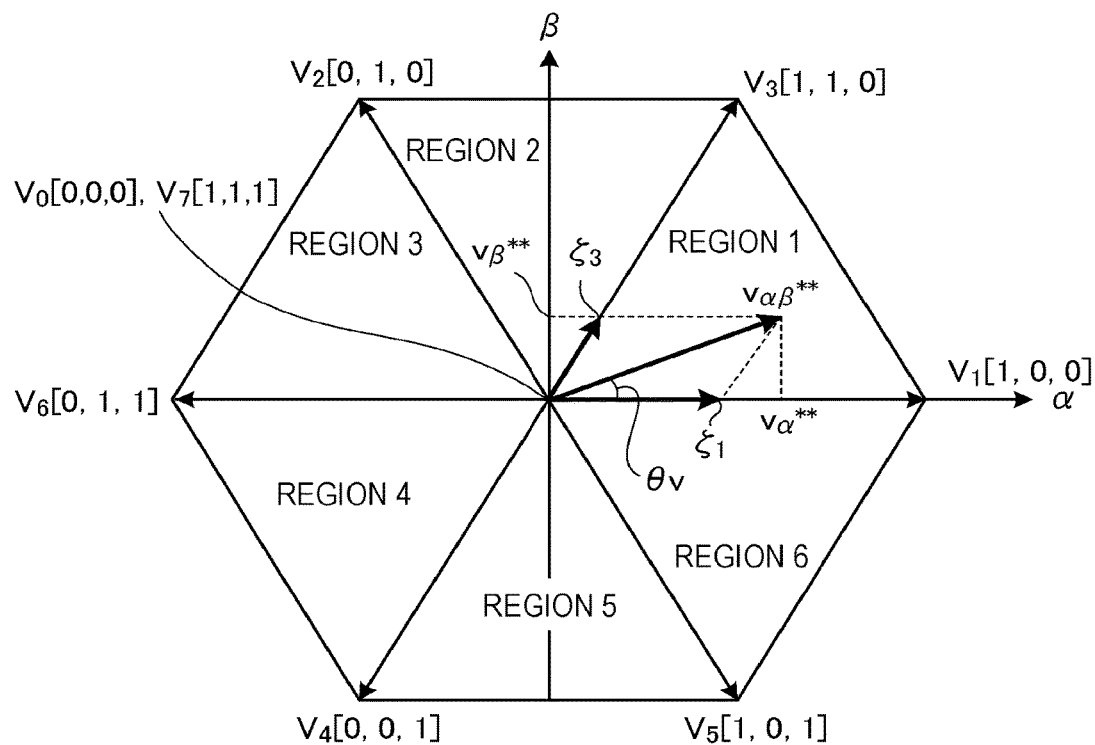
FIG. 2 illustrates the relation among the phases of the synthetic vector, the regions, and the fundamental voltage vectors.
FIG. 3 illustrates the relation among the phases of the synthetic vector, the regions, and the fundamental voltage vectors.

The calculator 34 calculates the output time ratios $\zeta_x$ and $\zeta_y$ of the plurality of fundamental voltage vectors $V_x$ and $V_y$ (one example of the voltage vector), the output time ratios $\zeta_x$ and $\zeta_y$ being corresponding to the synthetic vector $v_{\alpha\beta}$. FIG. 2 and FIG. 3 illustrate the relation among the phase θv of the synthetic vector $v_{\alpha\beta}$, the regions 1 to 6, and the fundamental voltage vectors $V_1$ to $V_7$.

The fundamental voltage vector is the voltage vector that can be output from the power converter according to the combination of ON/OFF of the switching elements of the power converter. In the power converter 10 illustrated in FIG. 1, the fundamental voltage vectors are eight kinds of fundamental voltage vectors $V_0$ to $V_7$ corresponding to the eight kinds of combinations of the ON/OFF of the six switching elements Sw.

The fundamental voltage vectors $V_0$ to $V_7$ include the fundamental voltage vectors $V_0$ and $V_0$ corresponding to the two kinds of zero voltage vectors, and the fundamental voltage vectors $V_1$ to $V_6$ corresponding to the six kinds of effective voltage vectors. In the example to be described below, one fundamental voltage vector $V_0$ is used as the zero voltage vector. In addition to or instead of the fundamental voltage vector $V_0$, the fundamental voltage vector $V_7$ can be used.

The calculator 34 calculates the output time ratios $\zeta_x$ and $\zeta_y$ of the plurality of fundamental voltage vectors $V_x$ and $V_y$ corresponding to the region including the synthetic vector $v_{\alpha\beta}$. The calculator 34 determines that, for example, the region held between the two kinds of fundamental voltage vectors $V_x$ and $V_y$ with a phase difference of 60° having the synthetic vector $v_{\alpha\beta}$ interposed therebetween is the region where the synthetic vector $v_{\alpha\beta}**$ exists.

The calculator 34 can, for example, determine the region including the synthetic vector $v_{\alpha\beta}$ on the basis of the phase θv (=a tan($v_\beta/v_\alpha$)) of the synthetic vector $v_{\alpha\beta}$. The calculator 34 can alternatively determine the region including the synthetic vector $v_{\alpha\beta}**$ by another method.

The calculator 34 determines, for example, the fundamental voltage vectors $V_1$ and $V_3$ as the fundamental voltage vectors $V_x$ and $V_y$ when 0≤θv<60, as illustrated in FIG. 3. Moreover, the calculator 34 calculates the output time ratios $\zeta_1$ and $\zeta_3$ of the fundamental voltage vectors $V_1$ and $V_3$ as the output time ratios $\zeta_x$ and $\zeta_y$.

Figure 4:
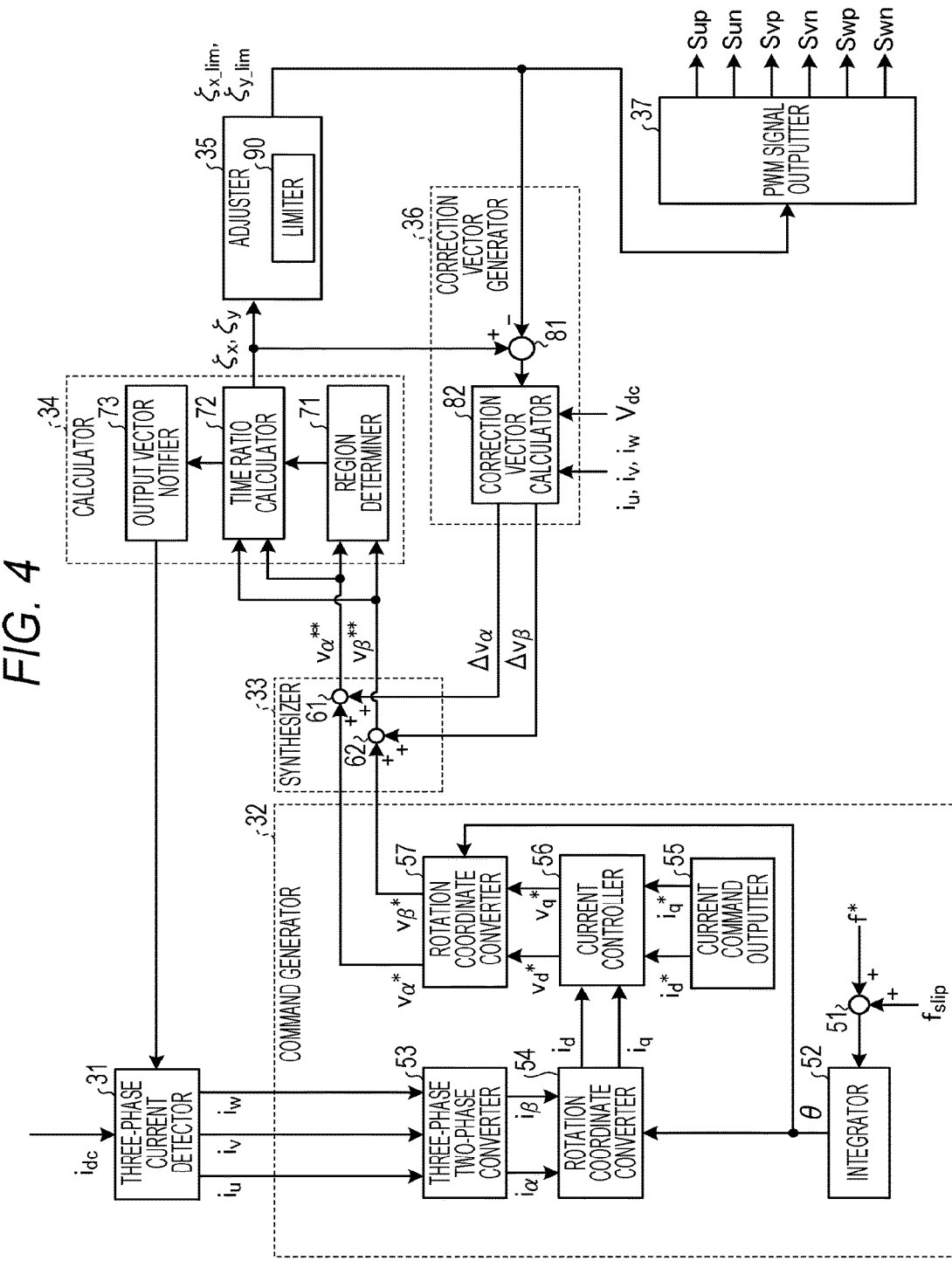
FIG. 4 illustrates a structure example of the controller illustrated in FIG. 1.

The adjuster 35 includes a limiter 90 as illustrated in FIG. 4. The limiter 90 adjusts the output time ratios $\zeta_x$ and $\zeta_y$ so that the output time ratios $\zeta_x$ and $\zeta_y$ do not become lower than the lower limit value $\zeta_{th}$, and outputs the ratios as the output time ratios $\zeta_{x\_lim}$, and $\zeta_{y\_lim}$.

For example, when the output time ratio $\zeta_x$ is lower than the lower limit value $\zeta_{th}$, the adjuster 35 outputs the lower limit value $\zeta_{th}$ as the output time ratio $\zeta_{x\_lim}$. When the output time ratio $\zeta_y$ is lower than the lower limit value $\zeta_{th}$, the adjuster 35 outputs the lower limit value $\zeta_{th}$ as the output time ratio $\zeta_{y\_lim}$.

On the other hand, when the output time ratio $\zeta_x$ is more than or equal to the lower limit value $\zeta_{th}$, the adjuster 35 outputs the output time ratio $\zeta_x$ as the output time ratio $\zeta_{x\_lim}$. When the output time ratio $\zeta_y$ is more than or equal to the lower limit value $\zeta_{th}$, the adjuster 35 outputs the output time ratio $\zeta_y$ as the output time ratio $\zeta_{y\_lim}$.

The correction vector generator 36 generates the correction vector $\Delta v_{\alpha\beta}$ on the basis of the adjustment result of the adjuster 35. The correction vector $\Delta v_{\alpha\beta}$ includes the α-axis correction value $\Delta v_\alpha$ corresponding to the α-axis component in the αβ-axis coordinate system and the β-axis correction value $\Delta v_\beta$ corresponding to the β-axis component in the αβ-axis coordinate system. For example, the correction vector generator 36 can generate the correction vector $\Delta v_{\alpha\beta}$ on the basis of the adjustment amount of the adjuster 35, for example, the difference between the output time ratios $\zeta_x$ and $\zeta_y$ and the output time ratios $\zeta_{x\_lim}$ and $\zeta_{y\_lim}$.

When at least one of the output time ratios $\zeta_x$ and $\zeta_y$ is lower than the lower limit value $\zeta_{th}$, the adjuster 35 adjusts the output time ratio $\zeta_x$ and/or $\zeta_y$ to be more than or equal to the lower limit value $\zeta_{th}$. In this case, the correction vector generator 36 generates the correction vector $\Delta v_{\alpha\beta}$ so that the error caused by such adjustment is corrected in the next calculation period.

The PWM signal outputter 37 generates the PWM signals Sup, Sun, Svp, Svn, Swp, and Swn (hereinafter may be referred to as PWM signals S) that control the power converter 10 so that the fundamental voltage vectors $V_x$ and $V_y$ are output at the time $T_x$ ($=\zeta_x \times T$) and $T_y$ ($=\zeta_y \times T$) corresponding to the output time ratios $\zeta_x$ and $\zeta_y$ that are more than or equal to the lower limit value $\zeta_{th}$. Note that "T" corresponds to the modulation period of the PWM control.

This can suppress the output width of the fundamental voltage vectors $V_x$ and $V_y$ output from the power converter 10 to be more than or equal to a certain level. This enables the stable detection of the current. Moreover, by synthesizing the correction vector $\Delta v_{\alpha\beta}$ with the voltage command vector $v_{\alpha\beta}*$ in the next calculation period every time the output time ratios $\zeta_x$, $\zeta_y$, $\zeta_{x\_lim}$ and $\zeta_{y\_lim}$ are calculated, the accuracy of the voltage output from the power converter 10 can be improved. Description is made of the structure of the controller 20 in more detail.

2. Controller 20

FIG. 4 illustrates the structure example of the controller 20 illustrated in FIG. 1. As described above, the controller 20 includes the three-phase current detector 31, the command generator 32, the synthesizer 33, the calculator 34, the adjuster 35, the correction vector generator 36, and the PWM signal outputter 37. The PWM signal outputter 37, the three-phase current detector 31, the command generator 32, the synthesizer 33, the calculator 34, the adjuster 35, and the correction vector generator 36 will be described in this order.

2.1 PWM Signal Outputter 37

The PWM signal outputter 37 outputs the PWM signals S according to the voltage vector pattern corresponding to the fundamental voltage vector $V_0$ and the plurality of fundamental voltage vectors $V_x$ and $V_y$ which are corresponding to the region including the synthetic vector $v_{\alpha\beta}**$, among the regions 1 to 6 illustrated in FIG. 3.

FIG. 5 illustrates the relation between the regions 1 to 6 and the voltage vector pattern. As illustrated in FIG. 5, the PWM signal outputter 37 generates the PWM signals S that control the power converter 10 so that the fundamental voltage vectors are output in the order of $V_0 \rightarrow V_1 \rightarrow V_3 \rightarrow V_3 \rightarrow V_1 \rightarrow V_0$ when, for example, 0≤θv<60.

The PWM signal outputter 37 generates the PWM signals S so that the fundamental voltage vector $V_1$ is output at the output time ratio $\zeta_{1\_lim}$ having passed the adjuster 35 and the fundamental voltage vector $V_3$ is output at the output time ratio $\zeta_{3\_lim}$ having passed the adjuster 35.

Note that in the voltage vector pattern illustrated in FIG. 5, the same fundamental voltage vector is output twice in the modulation period T of the PWM control. Therefore, in one modulation period T, each of the fundamental voltage vector $V_1$ with a length of $T_1$ ($=\zeta_1 \times T$)/2 and the fundamental voltage vector $V_3$ with a length of $T_3$ ($=\zeta_3 \times T$)/2 is output twice from the power converter 10.

The PWM signal outputter 37 generates the PWM signals S so that the fundamental voltage vector $V_0$ is output at the output time ratio $\zeta_0$ calculated on the basis of the output time ratios $\zeta_{1\_lim}$ and $\zeta_{3\_lim}$ having passed the adjuster 35. Note that the fundamental voltage vector $V_0$ with a length of $T_0$ ($=\zeta_0 \times T$)/2 is output twice from the power converter 10 in one modulation period T, which is similar to the fundamental voltage vectors $V_1$ and $V_3$.

The PWM signal outputter 37 can provide the output time ratio $\zeta_0$ of the fundamental voltage vector $V_0$ by the calculation of the formula (1) below. The calculation of the formula (1) may be performed not by the PWM signal outputter 37 but by the calculator 34. In this case, the calculator 34 can notify the PWM signal outputter 37 of the calculation result. The PWM signal outputter 37 generates the PWM signals S on the basis of the output time ratios $\zeta_{x\_lim}$, $\zeta_{y\_lim}$, and $\zeta_0$. The PWM signal outputter 37 applies the on-delay correction to the PWM signals S and outputs the corrected PWM signals S.

$$\zeta_0 = T - (\zeta_{x\_lim} + \zeta_{y\_lim}) \tag{1}$$

FIG. 6 illustrates the relation among the fundamental voltage vectors, the PWM signals, and the bus bar currents $I_{dc}$. As illustrated in FIG. 6, the PWM signal outputter 37 sets the PWM signal Sup at the active level (for example, high level) and sets the PWM signals Svp and Swp at the non-active level (for example, low level) in order to output the fundamental voltage vector $V_1$.

In addition, the PWM signal outputter 37 sets the PWM signals Sup and Svp at the active level (for example, high level) and sets the PWM signal Swp at the non-active level (for example, low level) in order to output the fundamental voltage vector $V_3$. Further, the PWM signal outputter 37 sets the PWM signals Sup, Svp, and Swp at the non-active level (for example, low level) in order to output the fundamental voltage vector $V_0$.

The PWM signal outputter 37 sets the signals obtained by inverting the PWM signals Sup, Svp, and Swp to the PWM signals Sun, Svn, and Swn, respectively. The PWM signal outputter 37 applies the on-delay correction to the PWM signals S and outputs the corrected PWM signals S to the power converter 10. The power converter 10 may include an amplification circuit that amplifies the PWM signals S and outputs the signals to the switching element Sw.

FIG. 7 illustrates the relation between the regions and the modulation ratios of the three-phase voltage. The PWM signal outputter 37 can calculate the modulation ratios $\zeta_u$, $\zeta_v$, and $\zeta_w$ of the three-phase voltages $v_u$, $v_v$, and $v_w$ corresponding to the regions on the basis of the output time ratios $\zeta_{x\_lim}$ and $\zeta_{y\_lim}$ as illustrated in FIG. 7. The PWM signal outputter 37 can generate the PWM signals S with the duty ratio corresponding to the modulation ratios $\zeta_u$, $\zeta_v$, and $\zeta_w$ by comparing the modulation ratios $\zeta_u$, $\zeta_v$, and $\zeta_w$ and the counter value of the up/down counter.

2.2 Three-Phase Current Detector 31

The three-phase current detector 31 acquires the bus bar current $I_{dc}$ detected by the current detector 13 on the basis of the acquisition timing calculated by the calculator 34. In addition, the three-phase current detector 31 provides the phase currents $i_u$, $i_v$, and $i_w$ on the basis of the acquired bus bar current $I_{dc}$.

The three-phase current detector 31 determines which one of the phase currents $i_u$, $i_v$, and $i_w$ the phase current detected on the basis of the bus bar current $I_{dc}$ corresponds to, on the basis of the kind of the fundamental voltage vector output from the power converter 10 as illustrated in FIG. 6.

FIG. 8 illustrates the example of the relation among the detected currents, the PWM signals Sup, Svp, and Swp, and the fundamental voltage vectors output from the power converter 10 in the case where the synthetic vector $v_{\alpha\beta}^{**}$ is included in the region 1. As illustrated in FIG. 8, the PWM signals Sup, Svp, and Swp are output so that the fundamental voltage vectors are output in the order of $V_0 \rightarrow V_1 \rightarrow V_3 \rightarrow V_3 \rightarrow V_1 \rightarrow V_0$ in the modulation period T.

When the power converter 10 outputs the fundamental voltage vector $V_1$, the current flows from the U phase to the V phase and the W phase in the electric motor 3. Therefore, in this case, the bus bar current $I_{dc}$ detected by the current detector 13 coincides with the phase current $i_u$. Therefore, the three-phase current detector 31 can detect the phase current $i_u$ by acquiring the bus bar current $I_{dc}$ detected by the current detector 13 at the timing when the fundamental voltage vector $V_1$ is output.

Moreover, when the fundamental voltage vector $V_3$ is output from the power converter 10, the current flows from the U phase and the V phase to the W phase in the electric motor 3. In this case, the bus bar current $I_{dc}$ detected by the current detector 13 coincides with the inversion value of the phase current $i_w$. Thus, the three-phase current detector 31 can detect the phase current $i_w$ by acquiring the bus bar current $I_{dc}$ detected by the current detector 13 and inverting the bus bar current $I_{dc}$ at the timing when the fundamental voltage vector $V_3$ is output.

Similarly, the three-phase current detector 31 can detect the phase current $i_v$ by acquiring the bus bar current $I_{dc}$ detected at the timing when the fundamental voltage vector $V_2$ is output. In addition, the three-phase current detector 31 can detect the phase current $i_w$ by acquiring the bus bar current $I_{dc}$ detected at the timing when the fundamental voltage vector $V_4$ is output. In addition, the three-phase current detector 31 can detect the phase current $i_u$ by acquiring and inverting the bus bar current $I_{dc}$ detected at the timing when the fundamental voltage vector $V_6$ is output. Further, the three-phase current detector 31 can detect the phase current $i_v$ by acquiring and inverting the bus bar current $I_{dc}$ detected at the timing when the fundamental voltage vector $V_5$ is output.

In this manner, the three-phase current detector 31 can detect the two phase currents on the basis of the two fundamental voltage vectors $V_x$ and $V_y$ corresponding to each region. The three-phase current detector 31 can detect the other phase current on the basis of the detected two phase currents by using, for example, the relation of $0 = i_u + i_v + i_w$. The three-phase current detector 31 can detect the phase current $i_v$ from the phase current $i_u$ and the phase current $i_w$ when, for example, the synthetic vector $v_{\alpha\beta}^{**}$ is included in the region 1.

The three-phase current detector 31 can acquire from the calculator 34 the information on the fundamental voltage vector output from the power converter 10, and then detect the phase currents $i_u$, $i_v$, and $i_w$ on the basis of the acquired information and the bus bar current $I_{dc}$. For example, the three-phase current detector 31 can detect the phase current $i_u$ on the basis of the bus bar current $I_{dc}$ detected by the current detector 13 when the fundamental voltage vector output from the power converter 10 is $V_1$.

As illustrated in FIG. 6, the bus bar currents $I_{dc}$ when the fundamental voltage vectors $V_1$, $V_2$, and $V_4$ are output correspond to the positive-polarity phase currents $i_u$, $i_v$, and $i_w$, respectively. In the description below, the fundamental voltage vectors $V_1$, $V_2$, and $V_4$ may be referred to as the positive-polarity fundamental voltage vectors for the convenience. The bus bar currents $I_{dc}$ when the fundamental voltage vectors $V_3$, $V_5$, and $V_6$ are output correspond to the negative-polarity phase currents $i_u$, $i_v$, and $i_w$, respectively. In the description below, the fundamental voltage vectors $V_3$, $V_5$, and $V_6$ may be referred to as the negative-polarity fundamental voltage vectors for the convenience.

2.3 Command Generator 32

As illustrated in FIG. 4, the command generator 32 includes an adder 51, an integrator 52, a three-phase two-phase converter 53, a rotation coordinate converter 54, a current command outputter 55, a current controller 56, and a rotation coordinate converter 57.

The adder 51 adds a slip frequency $f_{slip}$ to the frequency command f*. The integrator 52 integrates the addition result of the adder 51 to provide a phase $\theta$. The phase $\theta$ can be obtained by another known method. The structure of detecting the phase $\theta$ is not limited to the structure illustrated in FIG. 4.

The three-phase two-phase converter 53 calculates the $\alpha$-axis current $i_\alpha$ as the $\alpha$-axis component and the $\beta$-axis current $i_\beta$ as the $\beta$-axis component of the two orthogonal axes on the fixed coordinate from the phase currents $i_u$, $i_v$, and $i_w$ through the known three-phase two-phase conversion. The rotation coordinate converter 54 converts the $\alpha$-axis current $i_\alpha$ and the $\beta$-axis current $i_\beta$, which are the components of the $\alpha\beta$-coordinate system, into the d-axis current $i_d$ and the q-axis current $i_q$ through the known $\alpha\beta$/dq conversion on the basis of the phase $\theta$. The d-axis current $i_d$ is the d-axis component of the dq-axis coordinate system, which is the rotation coordinate system. The q-axis current $i_q$ is the q-axis component of this dq-axis coordinate system.

The current command outputter 55 outputs the d-axis current command $i_d^*$ and the q-axis current command $i_q^*$. The current controller 56 generates the d-axis voltage command $v_d^*$ by executing the PI (proportional integral) control so that the deviation between the d-axis current command $i_d^*$ and the d-axis current $i_d$ becomes zero. The current controller 56 generates the q-axis voltage command $v_q^*$ by executing the PI control so that the deviation between the q-axis current command $i_q^*$ and the q-axis current $i_q$ becomes zero.

The rotation coordinate converter 57 converts the coordinates of the d-axis voltage command $v_d^*$ and the q-axis voltage command $v_q^*$, which are the components of the dq-axis coordinate system, into the voltage command vectors $v_{\alpha\beta}^*$ corresponding to the components of the $\alpha\beta$-axis coordinate system through the known dq/$\alpha\beta$ conversion. The structure of the command generator 32 is not limited to the structure illustrated in FIG. 4 as long as the command generator 32 is configured to generate the voltage command vector $v_{\alpha\beta}^*$.

2.4 Synthesizer 33

The synthesizer 33 synthesizes the correction vector $\Delta v_{\alpha\beta}$ with the voltage command vector $v_{\alpha\beta}^*$ to generate the synthetic vector $v_{\alpha\beta}^{**}$. The synthesizer 33 includes adders 61 and 62 as illustrated in FIG. 4, and calculates the formulae (2):

$$v_\alpha^{**}=v_\alpha^{*}+\Delta v_\alpha$$

$$v_\beta^{**}=v_\beta^{*}+\Delta v_\beta \qquad (2)$$

The adder 61 adds up the α-axis voltage command $v_\alpha^{*}$ and the α-axis correction value $\Delta v_\alpha$, thereby providing the α-axis voltage command $v_\alpha^{**}$. The adder 62 adds up the β-axis voltage command $v_\beta^{*}$ and the β-axis correction value $\Delta v_\beta$, thereby providing the β-axis voltage command $v_\beta^{}$. The α-axis voltage command $v_\alpha^{}$ corresponds to the α-axis component of the synthetic vector $v_{\alpha\beta}^{}$. The β-axis voltage command $v_\beta^{}$ corresponds to the β-axis component of the synthetic vector $v_{\alpha\beta}^{**}$.

2.5 Calculator 34

The calculator 34 calculates the output time ratios $\zeta_x$ and $\zeta_y$ of the plurality of fundamental voltage vectors $V_x$ and $V_y$ from the power converter 10, the output time ratios $\zeta_x$ and $\zeta_y$ being corresponding to the synthetic vector $v_{\alpha\beta}^{**}$.

The calculator 34 includes a region determiner 71, a time ratio calculator 72, and an output vector notifier 73 as illustrated in FIG. 4. The region determiner 71 determines which one of the regions 1 to 6 (see FIG. 2 and FIG. 3) the region including the synthetic vector $v_{\alpha\beta}^{}$ corresponds to. For example, the region determiner 71 can calculate the phase θv of the synthetic vector $v_{\alpha\beta}^{}$ and determine the region including the synthetic vector $v_{\alpha\beta}^{**}$ on the basis of the phase θv.

The time ratio calculator 72 calculates the output time ratios $\zeta_x$ and $\zeta_y$ of the plurality of fundamental voltage vectors $V_x$ and $V_y$ corresponding to the region determined by the region determiner 71. "The plurality of fundamental voltage vectors corresponding to the regions" is the fundamental voltage vectors $V_x$ and $V_y$ as the two effective voltage vectors with a phase difference of 60° having the synthetic vector $v_{\alpha\beta}^{**}$ interposed therebetween.

The average voltage vector v as the average value of the fundamental voltage vectors $V_k$ (k=x, y, 0) of the output time ratio (k=x, y, 0) is represented by the following formula (3). Note that the fundamental voltage vector $V_0$ may be replaced by the fundamental voltage vector $V_7$ or two fundamental voltage vectors $V_0$ and $V_7$.

$$v=\Sigma \zeta_k V_k \qquad (3)$$

The output time ratio $\zeta_k$ can be represented by the following formula (4). The integrated values of the output time ratios $\zeta_x$, $\zeta_y$, and $\zeta_0$ can be represented by the following formula (5). In the formula (4), "$t_k$" refers to the output time of the fundamental voltage vector $V_k$.

$$\zeta_k=t_k/T \qquad (4)$$

$$\Sigma\zeta_k=1 \qquad (5)$$

As illustrated in FIG. 3, when the synthetic vector $v_{\alpha\beta}^{}$ exists in the region 1, the α-axis voltage command $v_\alpha^{}$ corresponding to the α-axis component of the synthetic vector $v_{\alpha\beta}^{}$ and the β-axis voltage command $v_\beta^{}$ corresponding to the β-axis component of the synthetic vector $v_{\alpha\beta}^{**}$ can be represented by the following formulae (6).

$$v_\alpha^{**}=\zeta_1 V_{\alpha 1}+\zeta_3 V_{\alpha 3}$$

$$v_\beta^{**}=\zeta_1 V_{\beta 1}+\zeta_3 V_{\beta 3} \qquad (6)$$

In the formulae (6), "$V_{\alpha 1}$" refers to the α-axis modulation ratio of the fundamental voltage vector $V_1$ ($V_{\alpha 1}=1$), and "$V_{\beta 1}$" refers to the β-axis modulation ratio of the fundamental voltage vector $V_1$ ($V_{\beta 1}=0$). Moreover, "$V_{\alpha 3}$" is the α-axis modulation ratio ($V_{\alpha 3}=\frac{1}{2}$) of the fundamental voltage vector $V_3$ and "$V_{\beta 3}$" is the β-axis modulation ratio ($V_{\beta 3}=\sqrt{(3/2)}$) of the fundamental voltage vector $V_3$.

Therefore, for example, the output time ratios $\zeta_1$ and $\zeta_3$ can be represented by the formulae (7) and (8). The time ratio calculator 72 can provide the output time ratios $\zeta_1$ and $\zeta_3$ by calculating the formulae (7) and (8).

$$\zeta_1 = \frac{V_{\beta 3}v_\alpha^{} - V_{\alpha 3}v_\beta^{}}{V_{\alpha 1}V_{\beta 3} - V_{\beta 1}V_{\alpha 3}} \qquad (7)$$

$$\zeta_3 = \frac{V_{\alpha 1}v_\beta^{} - V_{\beta 1}v_\alpha^{}}{V_{\alpha 1}V_{\beta 3} - V_{\beta 1}V_{\alpha 3}} \qquad (8)$$

Even when the synthetic vector $v_{\alpha\beta}^{}$ exists in other region than the region 1 (see FIG. 3), the time ratio calculator 72 can similarly calculate the output time ratios $\zeta_x$ and $\zeta_y$ on the basis of the α-axis modulation ratio and the β-axis modulation ratio of the fundamental voltage vectors $V_x$ and $V_y$ and the α-axis voltage command $v_\alpha^{}$ and the β-axis voltage command $v_\beta^{**}$.

The output vector notifier 73 notifies the three-phase current detector 31 of the information on the fundamental voltage vector output from the power converter 10. Thus, the three-phase current detector 31 can determine which one of the phase currents $i_u$, $i_v$, and $i_w$ the bus bar current $I_{dc}$ corresponds to.

2.6 Adjuster 35

The adjuster 35 includes the limiter 90. The limiter 90 adjusts the output time ratios $\zeta_x$ and $\zeta_y$ so that the output time ratios $\zeta_x$ and $\zeta_y$ do not become lower than the lower limit value $\zeta_{th}$, and outputs the ratios as the output time ratios $\zeta_{x\_lim}$ and $\zeta_{y\_lim}$.

For example, when the output time ratio $\zeta_x$ is lower than the lower limit value $\zeta_{th}$, the limiter 90 outputs the lower limit value $\zeta_{th}$ as the output time ratio $\zeta_{x\_lim}$. When the output time ratio $\zeta_y$ is lower than the lower limit value $\zeta_{th}$, the limiter 90 outputs the lower limit value $\zeta_{th}$ as the output time ratio $\zeta_{y\_lim}$.

On the other hand, if the output time ratio $\zeta_x$ is more than or equal to the lower limit value $\zeta_{th}$, the limiter 90 outputs the output time ratio $\zeta_x$ as the output time ratio $\zeta_{x\_lim}$. If the output time ratio $\zeta_y$ is more than or equal to the lower limit value $\zeta_{th}$, the limiter 90 outputs the output time ratio $\zeta_y$ as the output time ratio $\zeta_{y\_lim}$.

2.7 Correction Vector Generator 36

The correction vector generator 36 generates the correction vector $\Delta v_{\alpha\beta}$ on the basis of the adjustment result of the adjuster 35. For example, the correction vector generator 36 subtracts the output time ratios $\zeta_{x\_lim}$ and $\zeta_{y\_lim}$ from the output time ratios $\zeta_x$ and $\zeta_y$, and on the basis of the subtraction result, calculates the correction vector $\Delta v_{\alpha\beta}$. The correction vector $\Delta v_{\alpha\beta}$ includes the α-axis correction value $\Delta v_\alpha$ corresponding to the α-axis component in the αβ-axis coordinate system and the β-axis correction value $\Delta v_\beta$ corresponding to the β-axis component in the αβ-axis coordinate system.

The correction vector generator 36 includes a subtracter 81 and a correction vector calculator 82. The subtracter 81 subtracts the output time ratios and $\zeta_{x\_lim}$, $\zeta_{y\_lim}$ from the output time ratios $\zeta_x$ and $\zeta_y$, thereby providing the time ratio difference $\Delta\zeta_x$ and $\Delta\zeta_y$. The subtracter 81 provides the time ratio difference $\Delta\zeta_x$ and $\Delta\zeta_y$ by calculating the formulae (9), for example.

$$\Delta\zeta_x = \zeta_x - \zeta_{x\_lim}$$

$$\Delta\zeta_y = \zeta_y - \zeta_{y\_lim} \quad (9)$$

Next, the correction vector generator 36 calculates the formulae (10), for example, to provide the correction vector $\Delta v_{\alpha\beta}$ on the basis of the time ratio difference $\Delta\zeta_x$ and $\Delta\zeta_y$. In the formulae (10), "$V_{\alpha x}$" refers to the α-axis component of the fundamental voltage vector $V_x$ and "$V_{\beta x}$" refers to the β-axis component of the fundamental voltage vector $V_x$. Moreover, "$V_{\alpha y}$" refers to the α-axis component of the fundamental voltage vector $V_y$ and "$V_{\beta y}$" refers to the β-axis component of the fundamental voltage vector $V_y$.

$$\Delta v_\alpha = \Delta\zeta_x V_{\alpha x} + \Delta\zeta_y V_{\alpha y}$$

$$\Delta v_\beta = \Delta\zeta_x V_{\beta x} + \Delta\zeta_y V_{\beta y} \quad (10)$$

The correction vector generator 36 can provide the correction vector $\Delta v_{\alpha\beta}$ in view of the preset reference voltage $V_{dcz}$ when the voltage of the DC bus bar 15 (hereinafter referred to as the bus bar voltage $V_{dc}$) varies. The correction vector generator 36 can provide the correction vector $\Delta v_{\alpha\beta}$ by calculating the formulae (11), for example.

$$\Delta v_\alpha = (\Delta\zeta_x V_{\alpha x} + \Delta\zeta_y V_{\alpha y}) \times \frac{V_{dcz}}{V_{dc}} \quad (11)$$

$$\Delta v_\beta = (\Delta\zeta_x V_{\beta x} + \Delta\zeta_y V_{\beta y}) \times \frac{V_{dcz}}{V_{dc}}$$

Here, the relation between the output time ratios $\zeta_x$, $\zeta_y$, $\zeta_{x\_lim}$, and $\zeta_{y\_lim}$ and the synthetic vector $v_{\alpha\beta}^{**}$ is described on the αβ-axis coordinate system. In the description below, the calculation result in a certain calculation period is given the subscript "(0)" and the calculation result in the next calculation period is given the subscript "(1)" for the convenience.

Figure 9:
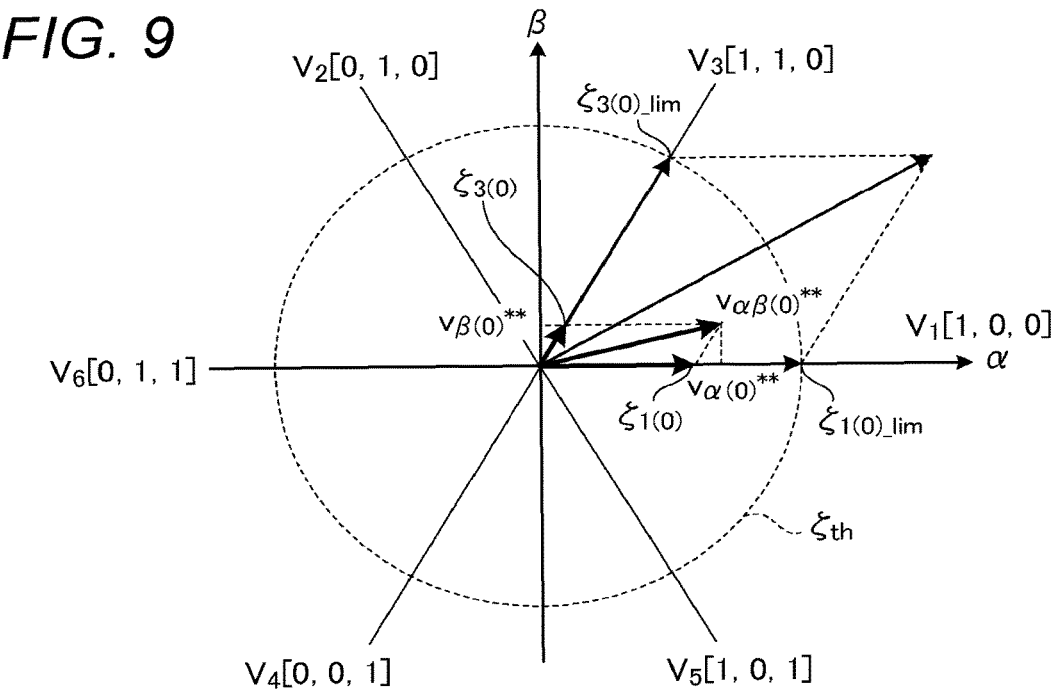
FIG. 9 illustrates the relation between the synthetic vector and the output time ratio when the synthetic vector exists in the region 1, which is shown in the $\alpha\beta$-axis coordinate system.

FIG. 9 illustrates the relation between the synthetic vector $v_{\alpha\beta(0)}^{}$ and the output time ratios $\zeta_{1(0)}$, $\zeta_{3(0)}$, $\zeta_{1(0)\_lim}$, and $\zeta_{3(0)\_lim}$ in the αβ-axis coordinate in the case where the synthetic vector $v_{\alpha\beta(0)}^{}$ exists in the region 1 (see FIG. 3).

In the example illustrated in FIG. 9, the output time ratios $\zeta_{1(0)}$ and $\zeta_{3(0)}$ calculated from the synthetic vector $v_{\alpha\beta(0)}^{**}$ are both shorter than the lower limit value $\zeta_{th}$. Therefore, the output time ratios $\zeta_{1(0)\_lim}$ and $\zeta_{3(0)\_lim}$ are set to the lower limit value $\zeta_{th}$. This can suppress the output of such a short fundamental voltage vector that makes the current detection difficult.

On the other hand, in this case, the fundamental voltage vector is output from the power converter 10 at the output time ratios $\zeta_{1(0)\_lim}$ and $\zeta_{3(0)\_lim}$ larger than the output time ratios $\zeta_{1(0)}$ and $\zeta_{3(0)}$. This causes the error of the output voltage.

Figure 10:
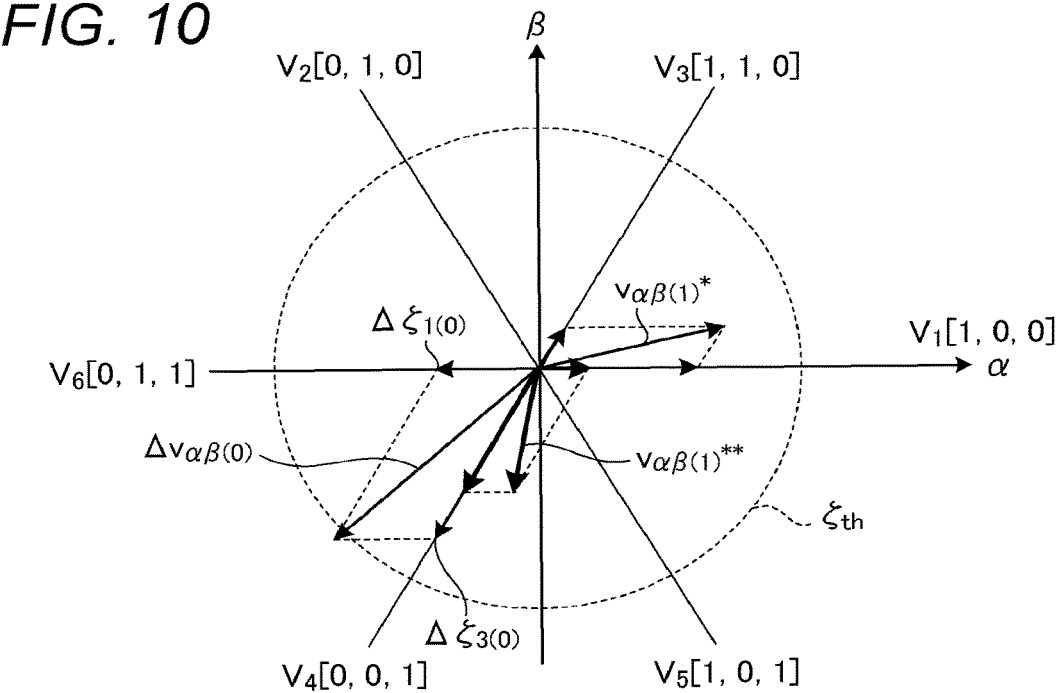
FIG. 10 illustrates the relation among the correction vector specified by the time ratio difference, the voltage command vector calculated in the next calculation period, and the synthetic vector, which is shown in the $\alpha\beta$-axis coordinate system.

In view of this, the correction vector generator 36 provides the time ratio difference $\Delta\zeta_{1(0)}$ and $\Delta\zeta_{3(0)}$ corresponding to the difference between the output time ratios $\zeta_{1(0)}$ and $\zeta_{3(0)}$ and the lower limit value $\zeta_{th}$ as illustrated in FIG. 10. The time ratio difference $\zeta_{1(0)}$ is represented by the output time ratio of the fundamental voltage vector $V_6$ and the time ratio difference $\Delta\zeta_{3(0)}$ is represented by the output time ratio of the fundamental voltage vector $V_4$. FIG. 10 illustrates the relation among the correction vector $\Delta v_{\alpha\beta(0)}$ specified by the time ratio difference $\Delta\zeta_{1(0)}$ and $\Delta\zeta_{3(0)}$, the voltage command vector $v_{\alpha\beta(1)}^{*}$ calculated in the next calculation period, and the synthetic vector $v_{\alpha\beta(1)}^{**}$, which is shown in the αβ-axis coordinate system.

Then, as illustrated in FIG. 10, the correction vector generator 36 provides the synthetic vector $v_{\alpha\beta(1)}^{**}$ by synthesizing the correction vector $\Delta v_{\alpha\beta(0)}$ specified by the time ratio difference $\Delta\zeta_{1(0)}$ and $\Delta\zeta_{3(0)}$ and the voltage command vector $v_{\alpha\beta(1)}^{*}$ calculated by the calculator 34 in the next calculation period. This can correct the error of the output voltage, which is caused in a certain calculation period, in the next calculation period. As a result, the deterioration in accuracy of the output voltage can be suppressed.

Figure 11:
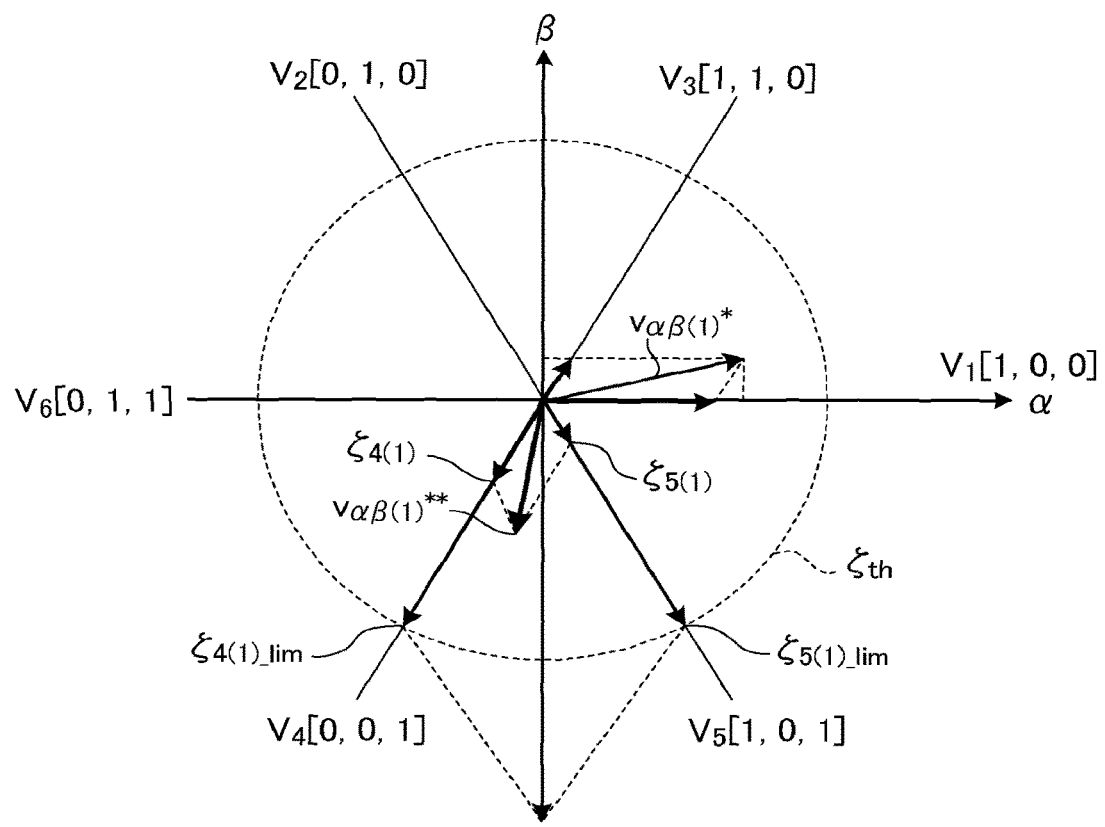
FIG. 11 illustrates the relation between the synthetic vector in the next calculation period and the output time ratio, which is shown in the $\alpha\beta$-axis coordinate system.

The synthetic vector $v_{\alpha\beta(1)}^{}$ in the next calculation period is included in the region 5 held between the fundamental voltage vectors $V_4$ and $V_5$. FIG. 11 illustrates the relation between the synthetic vector $v_{\alpha\beta(1)}^{}$ in the next calculation period and the output time ratios $\zeta_{4(1)}$, $\zeta_{5(1)}$, $\zeta_{4(1)\_lim}$, and $\zeta_{5(1)\_lim}$ in the αβ-axis coordinate system. As illustrated in FIG. 11, the output time ratios $\zeta_{4(1)}$ and $\zeta_{5(1)}$ calculated on the basis of the synthetic vector $v_{\alpha\beta(1)}^{**}$ are both shorter than the lower limit value $\zeta_{th}$. Thus, the output time ratios $\zeta_{4(1)\_lim}$ and $\zeta_{5(1)\_lim}$ are set to the lower limit value $\zeta_{th}$. This can suppress the output of such a short fundamental voltage vector that makes the current detection difficult.

The correction vector generator 36 performs the similar process subsequently. This can suppress the deterioration in accuracy of the output voltage while suppressing the output of such a short fundamental voltage vector that makes the current detection difficult.

Incidentally, in some cases, the PWM signal outputter 37 applies the on-delay correction or the on-voltage compensation on the modulation ratios $\zeta_u$, $\zeta_v$, and $\zeta_w$. In these cases, since the output width of the fundamental voltage vector becomes short, the stable detection of the phase current may become difficult.

In view of this, the correction vector generator 36 adds the amount of compensation of the modulation ratios $\zeta_u$, $\zeta_v$, and $\zeta_w$ by the on-delay correction or the on-voltage compensation to the correction vector $\Delta v_{\alpha\beta}$ as the voltage error. This makes it possible to output the compensated synthetic vector $v_{\alpha\beta}^{**}$ in the next calculation period.

Thus, even when the on-delay correction or the on-voltage compensation is performed on the three-phase voltage modulation ratios $\zeta_u$, $\zeta_v$, $\zeta_w$, and the deterioration in accuracy of the output voltage can be suppressed while the output of such a short fundamental voltage vector that makes the current detection difficult is suppressed.

The on-delay correction refer to the process of compensating the voltage error, which is caused by the on-delay for avoiding the upper arm and the lower arm from being turned on at the same time by delaying the timing at which the PWM signals S are turned off. The on-voltage compensation refers to the process of compensating the voltage error caused by the on-voltage drop of the switching element Sw of the power converter 10.

In the on-delay correction performed on the three-phase voltage modulation ratios $\zeta_u$, $\zeta_v$, and $\zeta_w$, when the two phases to be switched among the three phases of U phase, V phase and W phase have the same current polarity, the PWM width of the two phases uniformly increases or decreases. Therefore, the time ratio of the positive-polarity fundamental voltage vector remains the same before and after the on-delay correction. On the other hand, the time ratio of the negative-polarity fundamental voltage vector changes depending on the on-delay correction.

Among the three phases of the U phase, V phase, and W phase, the two phases to be switched may have the different current polarity. In this case, the time ratio of the negative-polarity fundamental voltage vector changes like when the two phases have the same polarity. On the other hand, in regard to the positive-polarity fundamental voltage vector, when the PWM width of one phase increases, the PWM width of the other phases decreases. Therefore, the time ratio of the positive-polarity fundamental voltage vector changes twice as much as the change occurring when the two phases have the same polarity.

In view of this, if the PWM signal outputter 37 performs the on-delay correction, the correction vector generator 36 decides the current polarity of the phase to be switched on the basis of the table shown in FIG. 12. FIG. 12 illustrates the relation between the regions and the current polarity.

As illustrated in FIG. 12, the correction vector generator 36 sets the calculation result of the sign function of the phase current $i_u$ to $I_{sig\_p}$ and the calculation result of the sign function of the phase current $i_v$ to $I_{sig\_n}$, when the synthetic vector $v_{\alpha\beta}{**}$ exists in the region 1.

For example, the correction vector generator 36 sets $I_{sig\_p}=1$ when the phase current $i_u$ is positive, and sets $I_{sig\_p}=-1$ when the phase current $i_u$ is negative. On the other hand, the correction vector generator 36 sets $I_{sig\_n}=1$ when the phase current $i_v$ is positive, and sets $I_{sig\_n}=-1$ when the phase current $i_v$ is negative. "$I_{sig\_p}$" refers to the current polarity of the phase that changes when the positive-polarity fundamental voltage vector is output. "$I_{sig\_n}$" refers to the current polarity of the phase that changes when the negative-polarity fundamental voltage vector is output.

Moreover, the correction vector generator 36 decides the compensation coefficients $V_{p\_compk}$ and $V_{n\_compk}$ on the basis of the multiplication result of the $I_{sig\_p}$ and $I_{sig\_n}$. "$V_{p\_compk}$" refers to the positive-polarity voltage compensation coefficient, and "$V_{n\_compk}$" refers to the negative-polarity voltage compensation coefficient.

For example, the correction vector generator 36 includes the compensation coefficient table illustrated in FIG. 13. The correction vector generator 36 sets $V_{p\_compk}=0$ and $V_{n\_compk}=1$ when the multiplication result of $I_{sig\_p}$ and $I_{sig\_n}$ is more than or equal to 0. The correction vector generator 36 sets $V_{p\_compk}=2$ and $V_{n\_compk}=1$ when the multiplication result of $I_{sig\_p}$ and $I_{sig\_n}$ is less than 0. FIG. 13 illustrates one example of the compensation coefficient table.

This similarly applies to the on-voltage compensation. Thus, the time ratios $\zeta_{p\_compk}$ and $\zeta_{n\_compk}$ of the voltage error due to the on-delay and the on-voltage can be expressed as shown in the formulae (12).

$$\zeta_{p\_comp} = \left(DT \times fc + \frac{V_{on}}{V_{dc}/2}\right) \times I_{sig\_p} \times V_{p\_compk}$$

$$\zeta_{n\_comp} = \left(DT \times fc + \frac{V_{on}}{V_{dc}/2}\right) \times I_{sig\_n} \times V_{n\_compk} \qquad (12)$$

In the formulae (12), "DT" refers to the on-delay time and "fc" refers to the modulation frequency of the PWM control. "$V_{on}$" refers to the on-voltage compensation voltage value and "$\zeta_{p\_compk}$" refers to the time ratio of the voltage error in the positive-polarity voltage vector due to the on-delay correction and the on-voltage. "$\zeta_{n\_compk}$" refers to the time ratio of the voltage error in the negative-polarity voltage vector due to the on-delay correction and the on-voltage.

The correction vector generator 36 provides the correction vector $\Delta v_{\alpha\beta}$ by calculating the formulae (13), for example. In the formulae (13), "$V_{\alpha p}$" refers to the α-axis component of the positive-polarity fundamental voltage vector. "$V_{\beta p}$" refers to the β-axis component of the positive-polarity fundamental voltage vector. "$V_{\alpha n}$" refers to the α-axis component of the negative-polarity fundamental voltage vector. "$V_{\beta n}$" refers to the β-axis component of the negative-polarity fundamental voltage vector. In the formulae (13), "$\Delta\zeta_p$" refers to the output time ratio of the positive-polarity fundamental voltage vector corresponding to the synthetic vector $v_{\alpha\beta}{}$ after passing the limiter 90 and "$\Delta\zeta_n$" refers to the output time ratio of the negative-polarity fundamental voltage vector corresponding to the synthetic vector $v_{\alpha\beta}{}$ after passing the limiter 90.

$$\Delta v_\alpha = (\Delta\zeta_p + \zeta_{p\_comp})V_{\alpha p} + (\Delta\zeta_n + \zeta_{n\_comp})V_{\alpha n}$$

$$\Delta v_\beta = (\Delta\zeta_p + \zeta_{p\_comp})V_{\beta p} + (\Delta\zeta_n + \zeta_{n\_comp})V_{\beta n} \qquad (13)$$

3. Process by Controller 20

Figure 14:
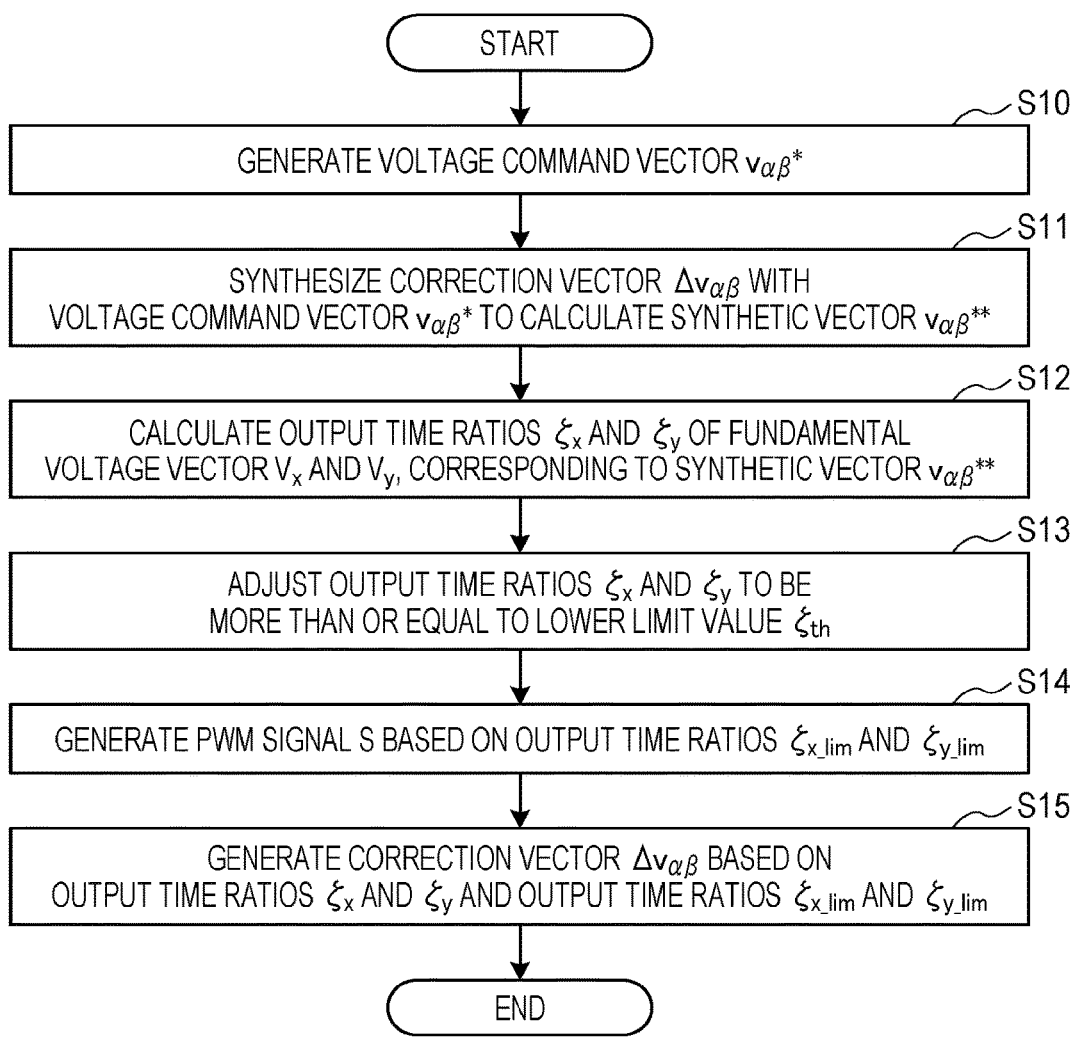
FIG. 14 is a flowchart illustrating the process by the controller.

FIG. 14 is a flowchart of the process conducted by the controller 20. The process illustrated in FIG. 14 is, for example, repeated every predetermined calculation period.

As illustrated in FIG. 14, the command generator 32 generates the voltage command vector $v_{\alpha\beta}{*}$ (Step S10) and next, the synthesizer 33 synthesizes the correction vector $\Delta v_{\alpha\beta}$ with the voltage command vector $v_{\alpha\beta}{*}$ to generate the synthetic vector $v_{\alpha\beta}{**}$ (Step S11).

Next, the calculator 34 calculates the output time ratios $\zeta_x$ and $\zeta_y$ of the plurality of fundamental voltage vectors $V_x$ and $V_y$ from the power converter 10, the output time ratios $\zeta_x$ and $\zeta_y$ being corresponding to the synthetic vector $v_{\alpha\beta}{**}$ (Step S12). The adjuster 35 adjusts the output time ratios $\zeta_x$ and $\zeta_y$ so that the output time ratios $\zeta_x$ and $\zeta_y$ do not become lower than the lower limit value $\zeta_{th}$ (so as to be more than or equal to the lower limit value $\zeta_{th}$), and outputs the ratios as the output time ratios $\zeta_{x\_lim}$ and $\zeta_{y\_lim}$ (Step S13).

The PWM signal outputter 37 generates the PWM signals S so that the fundamental voltage vector $V_x$ is output at the output time ratio $\zeta_{x\_lim}$ and the fundamental voltage vector $V_y$ is output at the output time ratio $\zeta_{y\_lim}$ (Step S14). The correction vector generator 36 subtracts the output time ratios $\zeta_{x\_lim}$ and $\zeta_{y\_lim}$ from the output time ratios $\zeta_x$ and $\zeta_y$. The correction vector generator 36 calculates the correction vector $\Delta v_{\alpha\beta}$ on the basis of the subtraction result (Step S15).

In this manner, the controller 20 generates the voltage command vector $v_{\alpha\beta}{*}$ in Step S10. In addition, the controller 20 generates the synthetic vector $v_{\alpha\beta}{**}$ by synthesizing the correction vector $\Delta v_{\alpha\beta}$ with the voltage command vector $v_{\alpha\beta}{*}$ in Step S11. Further, the controller 20 adjusts the output time of the plurality of fundamental voltage vectors corresponding to the synthetic vector $v_{\alpha\beta}{**}$ in Steps S12 and S13. In Step S15, the controller 20 generates the correction vector $\Delta v_{\alpha\beta}$ on the basis of the adjustment results of Steps S12 and S13. By repeating this process, the controller 20 can improve the accuracy of voltage output from the power converter 10 while suppressing the output width of the fundamental voltage vector output from the power converter 10 to be more than or equal to a certain level.

In the above embodiment, the calculator 34 calculates the output time ratios $\zeta_x$ and $\zeta_y$ as the information on the output time of the fundamental voltage vector. Instead of this, the calculator 34 can calculate the output time $T_x (=T \times \zeta_x)$ and $T_y (=T \times \zeta_y)$ as the information on the output time of the fundamental voltage vector. In this case, the adjuster 35 adjusts the output time $T_x$ and $T_y$ so that the output time $T_x$ and $T_y$ do not decrease to be lower than the lower limit value $T_{th}$, and outputs the output time as the output time $T_{x\_lim}$ and $T_{y\_lim}$. The subtracter 81 of the correction vector generator 36 subtracts the output time $T_{x\_lim}$ and $T_{y\_lim}$ from the output time $T_x$ and $T_y$, thereby providing the time difference $\Delta T_x (=T_x-T_{x\_lim})$ and $\Delta T_y (=T_y-T_{y\_lim})$. On the basis of the time difference $\Delta T_x$ and $\Delta T_y$ and the modulation period T of the PWM control, the correction vector generator 36 calculates the time ratio difference $\Delta\zeta_x=(\Delta T_x/T)$ and $\Delta\zeta_y=(\Delta T_y/T)$.

In the above embodiment, the controller 20 generates the correction vector corresponding to the difference of the information on the output time of the plurality of fundamental voltage vectors before and after the adjustment (for example, the output time ratios $\zeta_x$ and $\zeta_y$ or the time difference $\Delta T_x$ and $\Delta T_y$). The process of generating the correction vector is, however, not limited to this process. That is to say, the correction vector may be generated on the basis of the synthetic vector $v_{\alpha\beta}^{}$ so that the difference between the output voltage of the fundamental voltage vector output from the power converter 10 and the output voltage of the fundamental voltage vector with the adjusted output time is adjusted by the next synthetic vector $v_{\alpha\beta}^{}$.

The power conversion apparatus 1 according to the embodiment includes the power converter 10 with the plurality of switching elements Sw, and the controller 20 (one example of the control apparatus for the voltage vector) that controls the plurality of switching elements Sw. The controller 20 includes the command generator 32, the synthesizer 33, the adjuster 35, and the correction vector generator 36. The command generator 32 generates the voltage command vector $v_{\alpha\beta}^*$. The synthesizer 33 synthesizes the correction vector $\Delta v_{\alpha\beta}$ with the voltage command vector $v_{\alpha\beta}^*$ to generate the synthetic vector $v_{\alpha\beta}^{}$. The adjuster 35 adjusts the output time of the plurality of fundamental voltage vectors $V_x$ and $V_y$ (one example of the plurality of voltage vectors) from the power converter 10, the output time being corresponding to the synthetic vector $v_{\alpha\beta}^{}$. The correction vector generator 36 generates the correction vector $\Delta v_{\alpha\beta}$ on the basis of the adjustment result of the adjuster 35.

In this manner, the output time of the voltage vector can be secured by adjusting the output time of the voltage vector. This enables the stable detection of the phase currents $i_u$, $i_v$, and $i_w$. On the basis of the result of adjusting the output time of the voltage vector, the correction vector $\Delta v_{\alpha\beta}$ is generated and synthesized with the voltage command vector $v_{\alpha\beta}^*$. This can compensate the voltage error caused by the adjustment of the output time of the voltage vector. As a result, the deterioration in voltage accuracy can be suppressed.

On the basis of the adjustment amount of the adjuster 35 as the adjustment result of the adjuster 35, the correction vector generator 36 generates the correction vector $\Delta v_{\alpha\beta}$ corresponding to the adjustment amount.

In this manner, the correction vector generator 36 generates the correction vector $\Delta v_{\alpha\beta}$ corresponding to the adjustment amount of the adjuster 35. The voltage error caused by the adjustment of the output time can be compensated accurately.

The correction vector generator 36 generates the correction vector $\Delta v_{\alpha\beta}$ using as the adjustment amount of the adjuster 35, the difference in output time of the plurality of fundamental voltage vectors (for example, time ratio difference $\Delta\zeta_x$ and $\Delta\zeta_y$) before and after the adjustment of the output time of the plurality of fundamental voltage vectors by the adjuster 35.

In this manner, the correction vector generator 36 generates the correction vector corresponding to the difference in output time of the plurality of voltage vectors before and after the adjustment. Therefore, the voltage error caused by the adjustment of the output time can be compensated with higher accuracy.

The controller 20 includes the calculator 34. The calculator 34 calculates the information on the output time of the fundamental voltage vectors $V_x$ and $V_y$ (for example, output time ratios $\zeta_x$ and $\zeta_y$) as the information on the output time of the plurality of fundamental voltage vectors from the power converter 10, the output time being corresponding to the synthetic vector $v_{\alpha\beta}^{**}$. The adjuster 35 includes the limiter 90. The limiter 90 adjusts each piece of information on the output time so as to be more than or equal to the lower limit value (for example, the lower limit value $\zeta_{th}$). The calculator 34 is not necessarily included in the controller 20. That is to say, the calculator 34 may be included in the power conversion apparatus 1 as a member separate from the controller 20.

With the limiter 90 that sets the output time of the voltage vector to be more than or equal to the lower limit value, the output time of the voltage vector can be easily secured. This enables the stable detection of the current.

The correction vector generator 36 generates the correction vector $\Delta v_{\alpha\beta}$ using as the adjustment result of the adjuster 35, the difference of each piece of the information on the output time of the plurality of fundamental voltage vectors before and after passing the limiter 90.

In this manner, the correction vector generator 36 generates the correction vector $\Delta v_{\alpha\beta}$ on the basis of the difference of each piece of the information on the output time of the plurality of fundamental voltage vectors before and after passing the limiter 90. Thus, when the output time of the voltage vector is adjusted by the limiter 90, the correction vector $\Delta v_{\alpha\beta}$ corresponding to the adjustment result can be generated. This can suppress the deterioration in voltage accuracy.

The information on the output time corresponds to, for example, the output time ratios $\zeta_x$ and $\zeta_y$ (one example of the information representing the ratio of the output time) or the output time $T_x$ and $T_y$ (one example of the information representing the output time).

When the information on the output time to be adjusted is the output time ratios $\zeta_x$ and $\zeta_y$, for example, the lower limit value of the output time ratio is set according to the modulation period T of the PWM control. This can adjust the output time as appropriate. When the information on the output time to be adjusted is the output time $T_x$ and $T_y$, the output time can be adjusted as appropriate regardless of the modulation period T of the PWM control.

The power conversion apparatus 1 (controller 20) includes the PWM signal outputter 37 (one example of the driving signal generator). The PWM signal outputter 37 generates the PWM signals S (one example of driving signals) that drive the plurality of switching elements Sw, to which the on-delay correction has been applied, on the basis of the information on the output time of the plurality of voltage vectors after passing the limiter 90. The correction vector generator 36 generates the correction vector $\Delta v_{\alpha\beta}$ so as to compensate the voltage error due to the on-delay correction in addition to the voltage error due to the adjustment of the adjuster 35. The PWM signal outputter 37 is not necessarily included in the controller 20. The PWM signal outputter 37 may be included in the power conversion apparatus 1 as a member separate from the controller 20.

This enables to secure the output time of the voltage vector easily while suppressing the voltage error due to the on-delay correction.

The correction vector generator 36 generates the correction vector $\Delta v_{\alpha\beta}$ so as to compensate the voltage error due to the adjustment of the adjuster 35 and the voltage error due to the on-voltage of the switching element Sw.

This enables to secure the output time of the voltage vector easily while suppressing the voltage error due to the on-voltage of the switching element Sw.

The power converter 10 converts the DC power, which is supplied from the DC bus bar 15, into AC power by the control of the controller 20. The correction vector generator 36 generates the correction vector $\Delta v_{\alpha\beta}$ on the basis of the adjustment result of the adjuster 35 and the DC voltage variation $V_{dcz}/V_{dc}$ (one example of the variation in voltage of the DC bus bar 15).

This can generate the correction vector $\Delta v_{\alpha\beta}$ that, even in the occurrence of the variation in bus bar voltage $V_{dc}$, suppresses the voltage error caused by such variation.

The power conversion apparatus 1 described above includes the power converter 10, the command generator 32, and the following processing means. This processing means repeats the process of, when the output time of the voltage vector from the power converter 10 corresponding to the voltage command vector generated previously by the command generator 32 is adjusted to be more than or equal to the lower limit value, correcting the voltage command vector generated currently by the command generator 32 so as to compensate the voltage error caused by such adjustment. The synthesizer 33, the adjuster 35, and the correction vector generator 36 correspond to one example of the processing means.

Other effects and modified examples can be conceived easily by those skilled in the art. Therefore, the wider range of embodiments of the technique according to the present disclosure is not limited to the particular details and the representative embodiment described above. Thus, various changes can be made without departing from the spirit and range defined by the attached scope of claims and the equivalents.

The power conversion apparatus, the control apparatus for the voltage vector, and the method for controlling the voltage vector according to the embodiment may be any of the first to eighth power conversion apparatuses, the first control apparatus for the voltage vector, and the first method for controlling the voltage vector below.

The first power conversion apparatus includes: a power converter that includes a plurality of switching elements; and a controller that controls the plurality of switching elements. The controller includes: a command generator that generates a voltage command vector; a synthesizer that synthesizes a correction vector with the voltage command vector to generate a synthetic vector; an adjuster that adjusts an output time of a plurality of voltage vectors from the power converter, the output time being corresponding to the synthetic vector; and a correction vector generator that generates the correction vector on the basis of an adjustment result of the adjuster.

The second power conversion apparatus is the first power conversion apparatus configured such that the correction vector generator generates the correction vector corresponding to the adjustment amount using as the adjustment result, the adjustment amount of the adjuster.

The third power conversion apparatus is the second power conversion apparatus configured such that the correction vector generator generates the correction vector using as the adjustment amount, a difference of output time of the plurality of fundamental voltage vectors before and after the adjustment by the adjuster.

The fourth power conversion apparatus is the third power conversion apparatus, further including a calculator that calculates information on the output time of the plurality of voltage vectors from the power converter, the output time being corresponding to the synthetic vector. The adjuster includes a limiter that adjusts the information of the output time of the plurality of voltage vectors calculated by the calculator to be more than or equal to a lower limit value.

The fifth power conversion apparatus is the fourth power conversion apparatus configured such that the correction vector generator generates the correction vector using as the adjustment result, a difference of information on the output time of the plurality of voltage vectors before and after passing the limiter.

The sixth power conversion apparatus is the fifth power conversion apparatus configured such that the information on the output time includes information representing a ratio of the output time or information representing the output time.

The seventh power conversion apparatus is any of the fourth to sixth power conversion apparatuses, further including a driving signal generator that generates a driving signal for driving the plurality of switching elements to which on-delay correction has been applied, on the basis of the information on the output time of the plurality of voltage vectors after passing the limiter. The correction vector generator generates the correction vector so as to compensate a voltage error due to the on-delay correction.

The eighth power conversion apparatus is any of the first to seventh power conversion apparatuses configured such that the correction vector generator generates the correction vector so as to compensate a voltage error due to on-voltage of the switching element.

The ninth power conversion apparatus is any of the first to eighth power conversion apparatuses configured such that the power converter converts DC power, which is supplied from DC bus bar, into AC power by control of the controller. The correction vector generator generates the correction vector on the basis of the adjustment result of the adjuster and a change in voltage of the DC bus bar.

A first control apparatus for a voltage vector includes: a command generator that generates a voltage command vector; a synthesizer that synthesizes a correction vector with the voltage command vector to generate a synthetic vector; an adjuster that adjusts an output time of a plurality of voltage vectors corresponding to the synthetic vector; and a generator that generates the correction vector on the basis of an adjustment result of the adjuster.

The first method for controlling a voltage vector includes: generating a voltage command vector; synthesizing a correction vector with the voltage command vector to generate a synthetic vector; adjusting an output time of a plurality of voltage vectors according to the synthetic vector; and generating the correction vector on the basis of a result of the adjustment.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A power conversion apparatus, comprising:
  power converter comprising circuitry configured to generate a plurality of voltage vectors; and a controller comprising processing circuitry configured to
generate a voltage command vector,
synthesize a first correction vector with the voltage command vector to generate a synthetic vector which is based on the first correction vector and the voltage command vector,
adjust, via a PWM signal, an output time of the plurality of voltage vectors from the power converter such that the output time corresponds to the synthetic vector, and
generate a second correction vector based on a result of adjusting the output time.

2. The power conversion apparatus according to claim 1, wherein the processing circuitry is configured to generate an adjustment amount as the result, and generate the second correction vector corresponding to the adjustment amount.

3. The power conversion apparatus according to claim 2, wherein the processing circuitry is configured to use, as the adjustment amount, a difference of output time of the plurality of voltage vectors, and generate the first and second correction vectors respectively before and after adjusting the output time of the plurality of voltage vectors.

4. The power conversion apparatus according to claim 3, wherein the processing circuitry is configured to calculate information on the output time of the plurality of voltage vectors from the power converter such that the output time corresponds to the synthetic vector, and adjust each piece of the information on the output time of the plurality of voltage vectors calculated to be more than or equal to a lower limit value.

5. The power conversion apparatus according to claim 4, wherein the processing circuitry is configured to use, as the adjustment result, a difference of each piece of the information on the output time of the plurality of voltage vectors, and generate the first and second correction vectors respectively before and after adjusting each piece of the information on the output time of the plurality of voltage vectors calculated to be more than or equal to a lower limit value.

6. The power conversion apparatus according to claim 5, wherein the processing circuitry is configured to calculate the information on the output time, including information representing a ratio of the output time or information representing the output time.

7. The power conversion apparatus according to claim 6, wherein the processing circuitry is configured to generate a driving signal that drives switches of the circuitry to which on-delay correction is applied, based on the information the output time of the plurality of voltage vectors after adjusting each piece of the information on the output time of the plurality of voltage vectors calculated to be more than or equal to a lower limit value, and generate the second correction vector such that a voltage error due to the on-delay correction is compensated.

8. The power conversion apparatus according to claim 5, wherein the processing circuitry is configured to generate a driving signal that drives switches of the circuitry to which on-delay correction is applied, based on the information on the output time of the plurality of voltage vectors after adjusting each piece of the information on the output time of the plurality of voltage vectors calculated to be more than or equal to a lower limit value, and generate the second correction vector such that a voltage error due to the on-delay correction is compensated.

9. The power conversion apparatus according to claim 4, wherein the processing circuitry is configured to generate a driving signal that drives switches of the circuitry to which on-delay correction is applied, based on the information on the output time of the plurality of voltage vectors after adjusting each piece of the information on the output time of the plurality of voltage vectors calculated to be more than or equal to a lower limit value, and generate the second correction vector such that a voltage error due to the on-delay correction is compensated.

10. The power conversion apparatus according to claim 1, wherein the processing circuitry is configured to generate the second correction vector such that a voltage error due to an on-voltage of the circuitry is compensated.

11. The power conversion apparatus according to claim 1, wherein the processing circuitry is configured to control the power converter such that the power converter converts DC power, which is supplied from a DC bus bar, into AC power, and generate the correction vector based on the result of adjusting and a change in voltage of the DC bus bar.

12. The power conversion apparatus according to claim 1, wherein the power converter comprises the circuitry comprising a plurality of semiconductor switching elements.

13. The power conversion apparatus according to claim 12, wherein the processing circuitry is configured to generate an adjustment amount as the result, and generate the second correction vector corresponding to the adjustment amount.

14. The power conversion apparatus according to claim 1, wherein the processing circuitry is further configured to:
generate a second voltage command vector,
synthesize the second correction vector with the second voltage command vector to generate a second synthetic vector which is based on the second correction vector and the second voltage command vector,
adjust, via a second PWM signal, a second output time of the plurality of voltage vectors from the power converter such that the second output time corresponds to the second synthetic vector, and
generate a third correction vector based on a result of adjusting the second output time.

15. The power conversion apparatus according to claim 1, wherein the processing circuitry is further configured to repeat the generate the voltage command vector, synthesize the first correction vector, adjust the output time, and generate the second correction vector for each predetermined calculation period.

16. A control apparatus for controlling a voltage vector, comprising:
processing circuitry configured to
generate a voltage command vector,
synthesize a first correction vector with the voltage command vector to generate a synthetic vector which is based on the first correction vector and the voltage command vector,
adjust, via a PWM signal, an output time of a plurality of voltage vectors from a power converter such that the output time corresponds to the synthetic vector, and
generate a second correction vector based on a result of adjusting the output time.

17. The control apparatus according to claim 16, wherein the processing circuitry is configured to generate an adjustment amount as the result, and generate the second correction vector corresponding to the adjustment amount.

18. The control apparatus according to claim 17, wherein the processing circuitry is configured to use, as the adjustment amount, a difference of output time of the plurality of voltage vectors, and generate the first and second correction vectors respectively before and after adjusting the output time of the plurality of voltage vectors.

19. The control apparatus according to claim 18, wherein the processing circuitry is configured to calculate information on the output time of the plurality of voltage vectors from the power converter such that the output time corresponds to the synthetic vector, and adjust each piece of the information on the output time of the plurality of voltage vectors calculated to be more than or equal to a lower limit value.

20. The control apparatus according to claim 19, wherein the processing circuitry is configured to use, as the adjustment result, a difference of each piece of the information on the output time of the plurality of voltage vectors, and generate the correction vector before and after adjusting each piece of the information on the output time of the plurality of voltage vectors calculated to be more than or equal to a lower limit value.

21. The control apparatus according to claim 20, wherein the processing circuitry is configured to calculate the information on the output time, including information representing a ratio of the output time or information representing the output time.

22. A method for controlling a voltage vector, comprising:
generating a voltage command vector;
synthesizing a first correction vector with the voltage command vector to generate a synthetic vector which is based on the first correction vector and the voltage command vector;
adjusting, via a PWM signal, an output time of a plurality of voltage vectors from a power converter such that the output time corresponds to the synthetic vector; and
generating a second correction vector based on a result of adjusting the output time.

\* \* \* \* \*